(12) United States Patent
Doyle et al.

(10) Patent No.: US 8,048,951 B2
(45) Date of Patent: Nov. 1, 2011

(54) NATURAL RUBBER LATEX HAVING REDUCED ALLERGENICITY AND METHOD OF MAKING

(75) Inventors: William Doyle, Duluth, GA (US); Matthew Clark, Dacula, GA (US); Travis Honeycutt, Gainesville, GA (US)

(73) Assignee: Vystar Corporation, Duluth, GA (US)

( * ) Notice: Subject to any disclaimer, the term of this patent is extended or adjusted under 35 U.S.C. 154(b) by 0 days.

(21) Appl. No.: 12/356,355

(22) Filed: Jan. 20, 2009

(65) Prior Publication Data
US 2009/0192244 A1 Jul. 30, 2009

Related U.S. Application Data

(60) Provisional application No. 61/022,250, filed on Jan. 18, 2008, provisional application No. 61/081,927, filed on Jul. 18, 2008.

(51) Int. Cl.
*C08K 3/00* (2006.01)
*C08K 5/01* (2006.01)
*C08L 7/00* (2006.01)
*C08L 7/02* (2006.01)

(52) U.S. Cl. ............... 524/575.5; 524/437; 524/430; 524/571; 524/580; 524/925

(58) Field of Classification Search ............ 524/17, 524/437, 430, 571, 575.5, 580, 925
See application file for complete search history.

(56) References Cited

U.S. PATENT DOCUMENTS

| | | | |
|---|---|---|---|
| 4,590,123 A | 5/1986 | Hashimoto et al. | |
| 5,447,561 A | 9/1995 | Chiba et al. | |
| 5,563,241 A * | 10/1996 | Beezhold | 528/482 |
| 5,741,885 A | 4/1998 | Dove | |
| 5,910,567 A | 6/1999 | Tanaka et al. | |
| 5,962,147 A | 10/1999 | Shalub et al. | |
| 5,998,512 A | 12/1999 | Schloman | |
| 6,380,283 B1 | 4/2002 | Perrella et al. | |
| 6,790,933 B2 | 9/2004 | Huynh et al. | |
| 6,841,606 B2 | 1/2005 | Yanagisawa et al. | |
| 6,906,126 B2 * | 6/2005 | Honeycutt et al. | 524/428 |
| 7,056,970 B2 | 6/2006 | Honeycutt | |
| 2002/0103333 A1 * | 8/2002 | Honeycutt | 528/932 |
| 2002/0156159 A1 | 10/2002 | Amdur | 523/334 |
| 2003/0088006 A1 | 5/2003 | Yanagisawa et al. | |
| 2003/0236346 A1 | 12/2003 | Honeycutt | 524/575.5 |
| 2004/0031086 A1 * | 2/2004 | Huynh et al. | 2/161.7 |
| 2005/0031884 A1 | 2/2005 | Koide et al. | |
| 2005/0277722 A1 * | 12/2005 | Honeycutt | 524/437 |
| 2006/0235126 A1 * | 10/2006 | Webster | 524/419 |
| 2007/0265408 A1 | 11/2007 | Cornish et al. | 528/1 |
| 2009/0192244 A1 | 7/2009 | Doyle | |
| 2010/0267896 A1 | 10/2010 | Honeycutt | |

FOREIGN PATENT DOCUMENTS

| | | |
|---|---|---|
| EP | 0441406 | 8/1991 |
| EP | 1283219 | 2/2003 |
| JP | 11-012306 | 1/1999 |
| WO | WO 96/19531 | 6/1996 |
| WO | WO 2007/011333 | 1/2007 |
| WO | WO2009/092083 | 7/2009 |

OTHER PUBLICATIONS

International Search Report, International Application No. PCT/US2009/31445, Mar. 3, 2009.
International Search Report based on PCT/US2005/025018 dated Oct. 28, 2005.
European Search Report based on PCT/US2005/025018 dated Jun. 21, 2010.
International Search Report based on PCT/US2011/28684 dated May 19, 2011.

\* cited by examiner

*Primary Examiner* — James J Seidleck
*Assistant Examiner* — Deve E Valdez
(74) *Attorney, Agent, or Firm* — Greenberg Traurig, LLP; David J. Dykeman; Danielle T. Abramson

(57) ABSTRACT

A rubber latex composition is disclosed having reduced allergenicity. Methods for producing a rubber latex composition having reduced allergenicity are also disclosed.

3 Claims, No Drawings

NATURAL RUBBER LATEX HAVING REDUCED ALLERGENICITY AND METHOD OF MAKING

CROSS REFERENCE TO RELATED APPLICATIONS

This application claims priority to both U.S. Provisional Application Ser. No. 61/022,250, filed Jan. 18, 2008, and U.S. Provisional Application Ser. No. 61/081,927, filed Jul. 18, 2008, both of which are hereby incorporated by reference.

FIELD OF THE INVENTION

The present invention relates to a natural rubber latex composition having reduced allergenicity and a method of making the same.

BACKGROUND OF THE INVENTION

The use of *Hevea brasiliensis* natural rubber latex (NRL) as a protective material has a long history of usage dating back to the 1800s. The widespread use of barrier NRL articles like gloves and condoms increased tremendously in the 1980s primarily due to the "universal precautions" policy outlined by the Centers for Disease Control. NRL's popularity and longevity can be attributed to several factors. The physical properties of NRL are superior to non-latex synthetic products. Field latex, the feedstock material for NRL that continues to be readily available in Malaysia and Thailand, is now available in several new regions around the world including India, Vietnam, Indonesia, Liberia, Guatemala, and China. NRL is significantly less expensive than most petroleum-based synthetic materials whose cost continues to fluctuate with the cost of crude oil. Additionally, the reduced environmental impact of natural rubber latex compared to petroleum-based synthetic materials continues to be the preferred material of choice in an environmentally conscious society. The availability, ease of production and the performance of NRL products continue to make NRL the chosen material by manufacturers and users among industry and medical professionals. Today, there are over 40,000 commercially available products made from NRL. A concern with NRL continues to be its potential involvement with adverse health effects due to the antigenicity of NRL products. An intuitive means of controlling this parameter in the NRL source material is by de-proteination/protein modification. Validation of this process can be achieved by specific methods of protein quantification.

Although the first description of an allergic reaction to latex gloves appeared in the American Literature in 1933 when usage was slight, the majority of latex allergic reactions were documented in the late 80s and throughout the 90s and 2000s. Published data indicate 17% of American healthcare workers and up to 73% or more of frequently exposed patients, such as those with spina bifida, were sensitized to latex proteins.

Several attempts, including new source crops, synthetic lattices and various treatment methods, have been made to eliminate these problem proteins from *Hevea* NRL by biological, physical and/or chemical methods that affect the complex acid-base behavior of proteins. One approach has been to introduce the latex articles to multiple leaching steps and chlorination. This approach does reduce the protein levels in the finished product; however it weakens the latex film thus compromising the physical properties of the product. Another attempt to reduce proteins in NRL is the use of proteolytic enzymes to degrade the proteins in the latex solution. The issue with this approach is the introduction of another protein (the enzyme) to the latex, which may itself be allergenic. The most logical solution is the use of low-protein latex, such as the treated NRL of the present invention as this approach will more than likely reduce the possibility for an allergic response in the end user of the finished product. If high levels of protein are not present in the raw material they cannot appear in the manufactured product.

Two other non-*Hevea* NRL materials have been attempted to be commercialized in the US; guayule rubber latex and Taraxacum kok-saghyz, also known as the Russian dandelion. These materials are reported to be higher in cost compared to natural rubber and presently are available only in limited quantities. *Hevea* NRL has been around for more than a century and its antigenic proteins have been thoroughly researched. The allergenic properties and economic viability of latex from the guayule & Taraxacum kok-saghyz have yet to be scrutinized in the way that *Hevea* has been. Being natural products, both of these materials have their own unique set of proteins with potential allergenic behavior not yet understood.

Recently, it has been shown that allergens are distributed into few protein families and possess a restricted number of biochemical functions. The allergen functions found most frequently were limited to hydrolysis of proteins, polysaccharides, and lipids; binding of metal ions and lipids; storage; and cytoskeleton association. The limited number of protein families that are allergenic and the narrow functional distribution of most allergens support the existence of yet unknown factors that render proteins allergenic. Many of these specific protein functions play into the chemistry used to manipulate them yielding a modified NRL source material.

The last decade and a half has seen a great change in latex use as a result of publicity concerning these allergies. Today in the U.S. there is almost universal awareness of the risks associated with repeated latex exposure, particularly in the healthcare fields where exposure is more profound. Awareness of the risks, however, extends into the industrial glove market, and even to the general public, who have received risk warnings from various government and health-watch groups. As a result there exists much interest in the market, fueling a strong trend to reduce exposure to latex-associated allergens.

Manufacturers have responded in several ways: I) reduction or elimination of donning powder, 2) utilization of chlorinated glove washing and additional processing steps to reduce antigenic protein load, 3) use of coatings to reduce actual contact with latex, and 4) introduction of alternative materials that mimic, natural latex performance characteristics. Each of these industry reactions represents compromises either from ease of use, performance, or cost standpoint. In short, nothing beats the tactile, comfort, and barrier protection that is provided by natural latex products.

In the last ten years there has been an increasing awareness of the possible immunologic and other reaction risks associated with the use of latex gloves. This awareness is the result of the proliferation in glove usage among healthcare workers in order to avoid potential exposure to HIV/AIDS transmission sources.

An increase in the reported incidence of latex allergic sensitivity and other skin reactions has been concomitant with increased glove usage. This has spurred an effort by industry leaders and manufacturers to reduce exposure to latex. Glove makers have initiated latex substitution in the manufacture of gloves, limited use of donning powder so as to prevent antigenic proteins leached into the cornstarch powder from becoming airborne (a source of respiratory exposure and subsequent sensitization), and the introduction of low protein methods for latexes to reduce the overall protein content of gloves.

Latex rubber in its natural form consists of polymeric, long chain molecules consisting of repeating units of isoprene:

When it is harvested from the rubber tree, *Hevea brasiliensis*, the liquid, sticky substance also contains proteins like heavamine, hevein, and rubber elongation factor. Although the basic isoprene polymer is non-antigenic, the associated proteins are highly antigenic. It is important to note this difference in order to minimize the antigenic impact of natural latex without destroying its underlying structure.

In its natural state, natural latex does not possess characteristics that are commercially useful. In order to achieve utilitarian value, including strength, elasticity, and memory, the chains of isoprene must be cross-linked to one another. Depending on the type of rubber end product desired, this is achieved with either application of heat and sulfur, or in the case of latex rubber used in the manufacture of gloves, various chemical accelerators that donate or bind sulfur, thus speeding the cross-linking process. The major accelerators are thiurams, mercaptobenzothiazoles (MBTs) and carbamates.

In addition to accelerators, latex glove manufacturers utilize another class of additives, called sensitizers, which most frequently consist of substituted phenols. These substances are used to impede oxidation, and resultant degradation, of natural latex.

Foreign materials, natural latex proteins, accelerators, and sensitizers can all provoke human reactions, but the allergenic reactions due to the proteins are considered to be the most problematic in the healthcare field. The following briefly describes three major types of foreign material reactions most commonly associated with latex use:

Irritant dermatitis is skin irritation that does not involve the body's immune response, that is, it is not an allergic response. Frequent hand washing and inadequate drying, aggressive scrubbing technique or detergents, mechanical abrasive effect of powder, climatic irritation, and emotional stress can all cause this condition. Even though this is not an allergic reaction, irritant hand dermatitis can cause breaks in the skin which can facilitate entry of the sensitizing latex protein or chemicals found in the commercial product, and in turn lead to latex allergy.

Delayed cutaneous hypersensitivity (type PV allergy) is contact (hand) dermatitis generally due to the chemicals used in latex production. It is mediated via T-cells causing a skin reaction that is typically seen 6-48 hours after contact. The reaction is local and limited to the skin that has contact with the glove. While not life threatening, those with type IV allergy are at increased risk to develop type I allergy. As in irritant dermatitis, the broken skin barrier can provide an entry site into the body for foreign materials. This can produce sensitization to latex proteins leading to a more serious type of reaction.

The third and potentially most serious type of reaction associated with latex use is a true IgE/histamine-mediated allergy to protein (also called immediate, or type I hypersensitivity). This type of reaction can involve local or systemic symptoms. Local symptoms include contact urticaria (hives), which appear in the area where contact occurred, i.e., the hands, but can spread beyond that area and become generalized. More generalized reactions include allergic rhinoconjunctivitis and asthma. The presence of allergic manifestations to natural latex indicates an increased risk for anaphylaxis, a rare but serious reaction experienced by some individuals who have developed an allergy to certain proteins (e.g., insect stings, natural rubber, penicillin). This type I reaction can occur within seconds to minutes of exposure to the allergen. When such a reaction occurs, it can progress rapidly from swelling of the lips and airways, to shortness of breath, and may progress to shock and death, sometimes within minutes. While any of these signs and symptoms may be the first indication of allergy, in many workers with continued exposure to the allergen, there is progression from skin to respiratory symptoms over a period of months to years. Some studies indicate that individuals with latex allergy are more likely than latex non-allergic persons to be atopic (have an increased immune response to some common allergens, with symptoms such as asthma or eczema). Once natural latex allergy occurs, allergic individuals continue to experience symptoms, which have included life-threatening reactions.

There are several classes of people known to be at increased risk for latex allergy. Medical patients who have had multiple hospitalizations and have been exposed numerous times to latex medical products, healthcare workers, and atopic individuals comprise this high-risk group. Current estimates are that 8-17% of healthcare workers become sensitized. Despite the recent emphasis on universal precautions, the marked increase in glove usage due to commutable disease prevention is largely blamed for the increase in latex allergies among these groups. Atopic individuals (those with other allergies or asthma) are at significantly greater risk to develop latex allergy than the general population. It is estimated that as many as 25-30% of atopic healthcare workers may become sensitized.

The problems presented by allergic reactions to latex are exacerbated by the proliferation and widespread use of latex-based products. Latex presents great risk to persons in the health care industry where latex products are used extensively in the form of gloves, casts, dressings, tapes, catheters, tubes, drains, airway management devices, med delivery, tourniquets, monitoring devices, and others. One persistent threat lies in the cornstarch powder used to lubricate and ease donning of rubber gloves. The proteins absorb onto the powder and become aerosolized during use and when the gloves are donned and removed.

Products containing latex are also found throughout the home in the form of balloons, art supplies, toys, swimming equipment, contraceptive devices, cosmetics, bottle nipples, pacifiers, clothing, chewing gum, rubber bands, and others. Groups at risk include particularly children with spina bifida, those who have been shown to have a very high risk of latex sensitivity, patients with congenital urologic abnormalities, healthcare providers and rubber industry workers.

Since the severe allergic reactions to latex are due to their naturally occurring proteins, the prior art offers little in the way of solutions. For example, ammonia treatment of the NRL proteins can cause breakdown and precipitation of some latex proteins, but the allergenicity appears to be preserved and other antigenic latex proteins are unextractable. In short, the literature recommends that the only treatment available for latex allergy is avoidance.

The Food and Drug Administration (FDA), as well as other state and federal agencies, has received requests to ban the use of glove powder. It has been suggested that experimental and clinical studies demonstrate that glove powder on medical gloves can enhance foreign body reactions, increase infections and act as a carrier of natural latex allergens. The National Institute of Occupational Safety and Health (NIOSH) recently issued a safety alert recommending the use of powder-free, reduced protein content latex gloves to reduce exposure to natural latex proteins (allergens).

Experimental and clinical data demonstrate that some NRL proteins are allergenic. Further, natural latex proteins bind to cornstarch while aerosolized powder on NRL gloves is allergenic and can cause respiratory allergic reactions. Published studies support the conclusion that airborne glove powder represents a threat to individuals allergic to NRL and may represent an important agent for sensitizing non-allergic individuals. There are also published data (although limited) and clinical experience that cornstarch powder on NRL gloves may also be a contributing factor in the development of irritation and type IV allergy.

In addition to dusting powder, other lubricants may also be used in the manufacturing process. Latex and some polymers are tacky and dipped products such as condoms and gloves made of these materials stick to the mold or former. A mold-release lubricant such as calcium carbonate or a mixture of calcium carbonate and cornstarch is used to enable the removal of these dipped products like condoms and gloves from molds. The other side of the dipped product may be coated with a donning lubricant, such as cornstarch or silicone oils, to make donning easier and to prevent dipped products from sticking during the manufacturing process.

Over the past three years, the FDA has received requests to ban the use of all glove powders. These requests have been based on repeated clinical and experimental studies reporting that cornstarch on surgical gloves can damage tissue's resistance to infection, enhance the development of infection, serve as a potential source of occupational asthma, and provide a source of natural latex protein exposure to natural latex allergic individuals. The issues regarding the use of glove powder, except for the transport of natural latex protein allergens, apply to the use of glove powder on both NRL and synthetic gloves. Several states, acting on their own initiative have banned the sale and use of glove powders.

Thus, there is a need to develop a NRL composition and method of making the same that can provide reduced allergenicity. It is an object of the present invention is to teach a method of reducing the allergenicity of NRL prior to vulcanization to enable the creation of a commercial product relatively free of allergenicity with no apparent loss of physical properties.

SUMMARY OF THE INVENTION

The present invention provides a natural latex composition having reduced allergenicity and a method of making the inventive composition. In accordance with the purposes of this invention, as embodied and broadly described herein, the invention therefore provides, in one aspect a NRL composition having reduced allergenicity.

In another aspect, the present invention provides a method of reducing allergenicity of NRL, the method comprising subjecting a NRL, prior to vulcanization, to aluminum hydroxide so as to reduce protein levels in the latex rubber.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included therein and their previous and following description. It is also to be understood that the terminology used herein is for the purpose of describing particular embodiments only and is not intended to be limiting.

It must be noted that, as used in the specification and the appended claims, the singular forms "a," "an" and "the" include plural referents unless the context clearly dictates otherwise. Thus, for example, reference to "a natural latex composition" includes mixtures of natural latex compositions.

Often, ranges are expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

In this specification and in the claims that follow, reference will be made to a number of terms that shall be defined to have the following meanings:

A weight percent of a component, unless specifically stated to the contrary, is based on the total weight of the formulation or composition in which the component is included.

"Optional" or "optionally" means that the subsequently described event or circumstance may or may not occur, and that the description includes instances where said event or circumstance occurs and instances where it does not. For example, the phrase "optionally present" means that the substance at reference may or may not be present, and that the description includes instance wherein the substance is and is not present.

As used herein, "parts per hundred rubber" or "PHR" means the proportion of a component per 100 grams of elastomer.

"Treated NRL" as used herein, is intended to refer to a NRL composition that has been treated in accordance with the various methods of the present invention.

"Antigenic protein," as used herein, refers to a protein that can induce the generation of antibodies and can cause an immune response in a subject who comes in contact with the antigenic protein.

As briefly described above, the present invention provides a NRL composition having reduced allergenicity. The present invention also provides a method of making such a reduced allergenicity NRL, the method comprising contacting a NRL composition with an aluminum hydroxide, optionally agitating the resulting mixture, and then vulcanizing the resulting mixture. While not wishing to be bound by theory, it is believed that under certain conditions and in accordance with the instant disclosure, NRL can be treated with aluminum hydroxide to produce protein complexes. Further, the formed protein complexes can then be removed from a treated NRL composition.

In one aspect, the NRL of the present invention can be produced by exchanging and/or complexing at least a portion of the proteins from, for example, a field latex sap emulsion with aluminum hydroxide. Aluminum hydroxide can be stable under most conditions. Various ionic forms of aluminum hydroxide can bond with proteins of complementary charge which are driven toward ionic equilibria or an isoionic point. Aluminum hydroxide is an amphoteric substance, meaning it can act as either an acid or a base and can readily share electrons with proteins. Amino acids, the blocks that build the proteins, are both very weak acids and very weak bases, thus creating the basis for both ionic and covalent bonding to aluminum hydroxide. Aluminum hydroxide is commonly used as an absorbent, emulsifier, ion exchanger or antacid. Aluminum hydroxide can also be used in the purification of water because it can form a jelly-like structure, suspending unwanted materials in water, including bacteria.

Method of Making Reduced Allergenicity NRL

In one embodiment, the present invention involves a method of reducing allergenicity of NRL comprising contacting a NRL composition to an aluminum hydroxide and agitating the resulting mixture to produce an intimate admixture. The individual concentrations of latex and aluminum hydroxide can vary depending upon the process parameters and the desire properties of the resultant product. The individual concentrations of latex and aluminum hydroxide can also vary depending on variations of, for example, protein levels in raw materials. In one aspect, the present invention comprises any amount of latex combined with any amount of aluminum hydroxide, and is not intended to be limited to any particular concentration range of one or more components. In various exemplary embodiments, latex comprises from about 27 phr (parts per hundred rubber) to about 30 phr and aluminum hydroxide comprises from about 0.01 phr to about 5 phr, for example, about 0.01, 0.02, 0.04, 0.06, 0.08, 0.1, 0.2, 0.3, 0.4, 0.5, 0.6, 0.7, 0.8, 0.9, 1, 1.2, 1.4, 1.6, 1.8, 2, 2.5, 3, 3.5, 4, 4.5, or 5 phr, or from about 0.1 phr to about 1 phr, for example, about 0.1, 0.2, 0.3, 0.4, 0.5, 0.6, 0.7, 0.8, 0.9, or 1 phr. In a specific embodiment, at least about 0.1 phr aluminum hydroxide is admixed with the NRL composition. In another specific embodiment, about 0.4 phr aluminum hydroxide is contacted with a NRL composition. In another specific embodiment, about 1 phr aluminum hydroxide is contacted with a NRL composition.

Any aluminum hydroxide suitable for contacting with a NRL composition can be utilized in the present invention. The average particle size and distribution, the chemical purity, and/or the density of a particular aluminum hydroxide can vary depending upon the specific process parameters and/or the requirements of the desired final latex article. In various embodiments, the aluminum hydroxide has an average particle size of from about 1 to about 100 micrometers, for example, about 1, 2, 3, 4, 5, 6, 7, 8, 9, 10, 12, 14, 15, 16, 20, 30, 40, 50, 60, 70, 80, 90, or 100 micrometers; from about 1 to about 20 micrometers, for example, about 1, 2, 3, 4, 5, 6, 7, 8, 9, 10, 12, 13, 14, 15, 16, or 20 micrometers; or from about 5 to about 15 micrometers, for example, about 5, 6, 7, 8, 9, 10, 12, 14, or 15 micrometers. It should be noted that aluminum hydroxide particles having a smaller size and/or increased surface area can typically provide greater levels of protein reduction than larger sized particles. In one embodiment, the aluminum hydroxide has a molecular weight of about 78.00 and a density of about 2.42 $g/cm^3$.

The aluminum hydroxide of the present invention can be contacted with the NRL composition at any time prior to vulcanization. NRL compositions are frequently centrifuged to concentrate the composition with the added benefit of purifying the material by removal of a portion of water soluble protein material contained therein. In one embodiment of the present invention, the NRL composition is not centrifuged. In another embodiment, the NRL composition is centrifuged to remove at least a portion of the protein material contained therein. If a NRL composition is centrifuged, aluminum hydroxide can be added to the composition prior to or subsequent to centrifugation. In a preferred embodiment, aluminum hydroxide is contacted with the NRL composition prior to centrifuging, and the resulting mixture is then centrifuged.

In another embodiment, the aluminum hydroxide can be admixed with a NRL composition for a period of time, such as, for example, from about less than an hour to about 72 hours, for example, about 0.5, 1, 2, 3, 4, 5, 8, 10, 12, 15, 20, 22, 24, 26, 28, 30, 36, 40, 45, 50, 55, 60, 65, 70 or 72 hours, and optionally agitated. In another embodiment, the admixture is contacted for a period of time from about 18 to about 36 hours, for example, about 18, 20, 22, 24, 26, 28, 30, 32, 34, or 36 hours with agitation. In a specific embodiment, the aluminum hydroxide is contacted with the NRL composition for about 5 hours. In another embodiment, the aluminum hydroxide is contacted with the NRL composition for about 36 hours. In yet another embodiment, the aluminum hydroxide is contacted with the NRL composition for about 72 hours. While not wishing to be bound by theory, it is believed that contacting the NRL composition with aluminum hydroxide modifies at least a portion of the antigenic protein within the NRL composition.

It should be noted that other components, such as, for example, fillers, additives, rheological and/or processing aids can be added to the NRL composition before, simultaneous with, and/or after addition of the aluminum hydroxide.

In various embodiments, one or more surfactants can be mixed with the NRL composition. A surfactant, if used, can be contacted with and/or mixed with a NRL composition at any time prior to vulcanization. In a preferred embodiment, a surfactant is mixed with a NRL and aluminum hydroxide composition prior to the optional removal of aluminum hydroxide. Addition of a surfactant can, while not wishing to be bound by theory, facilitate the association and/or removal of both hydrophobic and hydrophilic proteins from the NRL composition. In addition, a surfactant, if used, can, in various embodiments, result in facile removal of proteins from the composition by a subsequent leaching and/or extraction step. A surfactant, if used, can be any surfactant suitable for use in a NRL composition. In various embodiments, a surfactant can comprise an anionic surfactant, a cationic surfactant, a nonionic surfactant, or a combination thereof. Further, a surfactant, if used, can be added or contacted in any concentration suitable for use in a given process and/or for producing a desired latex article.

The combination of an aluminum hydroxide/surfactant treatment can, in various embodiments, result in significantly improved removal of protein from the NRL composition. The addition of an optional surfactant can facilitate liberation of proteins absorbed onto the latex particle layer. In such a treatment, the liberated (hydrolyzed) proteins can associate with and/or bind to the aluminum hydroxide present in the solution. At near neutral pH values, aluminum hydroxide is not substantially water soluble and can be removed via centrifugation, as described above. The use of a surfactant can provide additional benefits upon aging of a latex solution and/or article. In one embodiment, proteins in a latex composition that has not been treated with a surfactant can remain absorbed onto latex particles and can be subsequently released upon aging. In various embodiments, a NRL composition not treated with aluminum hydroxide can have an antigenic protein value of from about 32 to about 96% higher than a composition treated with aluminum hydroxide and surfactant after 21 days storage. While the specific improvement of a composition can vary depending on, for example, the properties of the feedstock material, it should be appreciated that the addition of a surfactant to a treatment process can result in reduced antigenic protein levels, even after storage, and thus, improved stability of the resulting latex solution or article.

Once the admixture of NRL and aluminum hydroxide is contacted and optionally agitated, thus complexing and/or modifying at least a portion of the antigenic protein, the treated latex containing modified protein can be vulcanized to produce a latex article. In one embodiment, a vulcanizing step can be performed without substantially disrupting the physical and/or chemical properties of the NRL.

After treatment with aluminum hydroxide, the aluminum hydroxide and any antigenic protein that has associated with and/or bound to the aluminum hydroxide can be optionally removed. In one embodiment, at least a portion of the aluminum hydroxide is removed from the NRL composition after contacting and agitation. In another embodiment, substantially all of the aluminum hydroxide is removed from the NRL composition after contacting and agitation. Removal of aluminum hydroxide from a treated NRL composition can be performed by any suitable technique. In various embodiments, removal of aluminum hydroxide can be performed by filtration techniques, centrifugation, or a combination thereof. Treated NRL compositions can also be subjected to a treatment step comprising exposure to hot water and/or chlorine or a chlorine containing solution, such as, for example, chlorine containing solutions commonly utilized in latex manufacturing processes.

After the optional removal of aluminum hydroxide from a NRL composition, the resulting latex can exhibit improved optical properties, such as, for example, a cleaner color and/or appearance, reduced color, and/or increased translucency. Such improvements, while not wishing to be bound by theory, are believed to be due to the removal or proteins, lipids and/or lutoids, or a combination thereof from the NRL composition. While not wishing to be bound by theory, it is believed that untreated NRL containing these materials can hydrate quicker, thus compromising the resultant articles tensile strength and chemical barrier, especially for example, upon aging.

In another aspect, a portion of, substantially all of, or all of the aluminum hydroxide can remain in a treated NRL composition. In yet another aspect, an excess of aluminum hydroxide can be used and/or additional aluminum hydroxide added to the composition such that a residual amount of aluminum hydroxide remains, for example, suspended in a liquid latex solution. Such an amount of aluminum hydroxide can be added prior to, simultaneous to, or subsequent to the addition of any other amounts of aluminum hydroxide, and optionally after removal of at least a portion of any earlier added aluminum hydroxide that can be complexed to protein. Residual aluminum hydroxide can be useful in various aspects due to the fact that some protein that is covalently bonded to a rubber particle can persist, but in the continued presence of an alkali pH, and in some aspects, especially when compounded, the backbone of such a protein can break and the protein/peptide subsequently go into the aqueous phase of the composition. Thus, the presence of aluminum hydroxide can, in various aspects, complex proteins, creating an insoluble precipitate known as an organic lake.

Further, while not wishing to be bound by theory, it is hypothesized that as water is removed during production of a latex article, a salt of the protein and aluminum hydroxide can be formed that displaces water as a byproduct. Once such a salt is formed, the protein will have no available reactive sites. Such a protein can remain present in the composition or produced article as part of a neutral and non-reactive molecule, without resulting in allergenicity.

Digestion of any remaining protein can be thermodynamically driven and can be well suited to achieving low protein levels in, for example, dipping applications such as gloves and condoms. Further, such a digested precipitate can be easily washed and/or extracted using common industry techniques.

Removal of proteins and unreacted compounds from a composition can be performed by a variety of suitable methods. In one aspect, a wet-gel leaching technique can be used to remove, for example, excess calcium nitrate and/or other water-soluble non-rubber materials, such as, for example, proteins and added compounding ingredients. Literature references describe protein removal by wet-gel leaching to be ineffective due to the fact that a significant portion of such proteins have typically not migrated to a surface when, for example, a film was heated to attain the wet-gel state. In one aspect, since the techniques of the present invention can remove significant portions of protein during NRL creation, the typically expected increases in protein at various stages of article (e.g., glove) production do not occur, allowing manufacturers opportunities to reduce the complexity of and/or the number of steps in the manufacturing process.

In one embodiment, the methods of the present invention provide an advantage over traditional latex processing methods can be easily integrated into the current processing scheme without the need to acquire and/or install additional capital equipment.

Treated NRL Having Reduced Allergenicity

The NRL composition formed by the method described herein can provide reduced allergenicity over traditional latex rubber products and can be suitable for use in a variety of applications. While not intending to be limited, applications for products produced from treated NRL can include medical, health care, and personal care products, such as, for example, examination and surgical gloves, condoms, breather bags, latex tubing, probe covers, and catheters, along with other applications such as threads, foams, cold seal and pressure sensitive adhesives, and balloons.

Products produced from the treated NRL composition of the present invention can demonstrate excellent resistance to aging compared to untreated NRL (e.g., *Hevea*) samples. In one embodiment, and while not wishing to be bound by theory, the use of aluminum hydroxide can bind and/or remove antigenic protein from a latex composition and can also assist in the removal of species vulnerable to free radical breakdown. Removal of such species can prevent, reduce, and/or delay degradation of rubber articles produced form NRL. For example, the presence and/or contacting of aluminum hydroxide with a NRL composition can provide increased stability of freshly harvested latex. The aluminum hydroxide treatment can thus be used as a partial and/or complete replacement for surfactants. In one embodiment, a NRL composition is treated with aluminum hydroxide and is not treated and/or contacted with a surfactant. In another embodiment, a NRL composition is treated with aluminum hydroxide and is treated and/or contacted with a surfactant. The combination of aluminum hydroxide and surfactant treatment and/or contacting with a NRL composition can, in various embodiments, provide enhanced stability and protein removal.

Film samples and products made from a NRL treated in accordance with the methods of the present invention can provide a significant reduction in protein levels over products prepared using traditional methods.

A treated NRL composition can have any level of antigenic protein present that is suitable for an intended application. As tolerances for antigenic proteins can vary depending upon the intended application, method of use, and human factors, the target level of antigenic protein in a treated NRL composition can also vary and the present invention is not intended to be limited to a treated NRL composition having any particular antigenic protein level. In one aspect, a treated NRL composition is free of or substantially free of antigenic protein. In other aspects, a treated NRL composition can have less than about 100 µg, less than about 50 µg, less than about 30 µg, less than about 20 µg, less than about 10 µg, less than about 5 µg, or less than about 2 µg of antigenic protein per gram of composition. In still other aspects, a treated NRL composition can have less than about 100 µg/dm$^2$, less than about 50 µg/dm$^2$, less than about 30 µg/dm$^2$, less than about 20 µg/dm$^2$, less than about 10 µg/dm², less than about 5 µg/dm², or less than about 2 µg/dm² of antigenic protein.

EXPERIMENTAL

The following examples are put forth so as to provide those of ordinary skill in the art with a complete disclosure and description of how the reduced allergenic NRL compositions and associated processes and methods are constructed, used, and evaluated, and are intended to be purely exemplary of the invention and are not intended to limit the scope of what the inventors regard as their invention. Efforts have been made to ensure accuracy with respect to numbers (e.g., amounts, temperature, film thickness, etc.) but some errors and deviations should be accounted for. Unless indicated otherwise, parts are parts by weight, temperature is in ° C. (Celsius) or is at ambient temperature, and pressure is at or near atmospheric.

Example 1

A series of films were created, a first being a control sample of NRL not involving the teachings of the present invention. This material was applied to a glass plate.

A series of three additional films were created, in each instance, using the same NRL which was employed to make the above-reference film. 0.05% aluminum hydroxide by weight having a density of 2.42 g/cm³ and molecular weight of 78.00 was mixed and agitated with the NRL for 72 hours. Next, this sample was processed into a film on a glass plate and labeled "RA-8". A second film was created labeled "RAL-1-2". Sample RAL-1-2 differed from sample RA-8 in that 0.5% lignin by weight having a density of 0.6 g/ml was mixed with 0.06% by weight aluminum hydroxide having a density of 2.42 g/cm³ and NRL for 72 hours. Next, this sample was processed into a film on a glass plate. A third film was created labeled "RAFS-4" Sample RAFS-4 differed from the other samples in that 0.5% fumed silica by weight having a density of 2.2 g/cm² and surface area 255 mVg was mixed with 0.06% by weight aluminum hydroxide having a density of 2.42 g/cm³ and NRL for 72 hours. Next, this sample was processed into a film on a glass plate. Films RA-8, RAL-I-2 and RAFS-4 were analyzed by conducting LEAP assays. The following results were measured noting that, in addition to the films, the control sample of latex film was also scrutinized.

ELISA Inhibition Assay (ASTM D6499-03). The data is expressed as antigenic latex protein in micrograms/gram of sample. The untreated liquid latex contained 636.3 µg/g while the control film from untreated liquid latex contained 33.0 µg/g of antigenic protein. The RA-S liquid latex sample contained 12.1 µg/g of protein and latex film from the same sample contained 17.1 µg/g of antigenic protein. The RAL-1-2 liquid latex sample contained 12.3 µg/g of protein and the latex film from the same sample contained 0.4 µg/ml. The RAFS-4 liquid latex sample contained 12.3 µg/g of protein and latex film from the same sample contained 1.1 µg/g. Two additional samples, identified as RAPL-10 and RAPL-11 were prepared.

RAPL-10 had a sample weight of 11.5 g, an extract volume of 58 ml, an inhibition assay concentration of less than 0.03 mg/ml and a surface area 2.9 dm² when spread upon a planar surface. RAPL-10 consisted of NRL that was premixed with 0.15% (wt.) Al(OH)₃ in concentrated KOH and 0.50% (wt.) lignin, for 72 hours.

RAPL-11 had a sample weight of 10.5 g, an extract volume of 53 ml, an inhibition assay concentration of 0.2 mg/ml and a surface area of 2.9 dm² when spread upon a planar surface. RAPL-11 consisted of NRL that was pre-mixed for 72 hours with 0.20% (wt.) Al(OH)3 in concentrated KOH and 0.50% (wt.) lignin prior to vulcanization.

The antigenic protein levels of RAPL-10 and RAPL-11 were measured. RAPL-10 exhibited a level of less than 0.2 mg/g or 0.8 mg/ml and RAPL-11 exhibited a level of approximately 0.8 mg/g or 2.7 mg/ml.

It is quite apparent from the test data which was developed and reported above that dramatic reduction in protein levels is achieved by the relatively simple processes of denaturing protein found in natural latex rubber with, aluminum hydroxide alone or with lignin and a fumed silica. All of these processes are employed prior to vulcanization of the NRL. In doing so, products can be produced while reducing risks imposed upon users of NRL products, including healthcare professionals, as a result of type I hypersensitivity. Most importantly, this is accomplished without diminishing the physical properties of NRL which makes commercial products made from this material so desirable.

Example 2

*HEVEA* vs Treated NRL Protein Determination

In a second example, *Hevea* NRL proteins are measured by accredited test methods. The most frequently used test methods include the Modified Lowry ASTM D5712-05 (Lowry) and ELISA Inhibition ASTM D6499-03 (ELISA). These test methods have unique sensitivities and specificity. They measure total protein and antigenic protein, respectively.

The Lowry test involves the reaction of latex proteins with an alkaline copper tartrate compound and the subsequent reaction of the protein-copper tartrate complex with Folin reagent, resulting in a blue color read using a spectrophotometer at 700 nm. The Lowry test is subject to interference by chemical accelerators, such as carbamates, thiurams, benzothiazoles and guanidines, used in the production of latex gloves and phenolic chemicals naturally found in latex. The Lowry test has been standardized as an ASTM test method D5712-05 for the analysis of protein in NRL and is recognized by the FDA for determination of protein levels in medical gloves.

The ELISA inhibition test measures NRL antigens by using latex-specific antibodies collected from hyperimmunized rabbits. This immunochemical method is much more sensitive and reproducible than the Lowry test. It also does not suffer from the limitations of interferences as does the Lowry test. The FDA does not allow protein level claims below 50 micrograms per dm² of glove. This value has no established biological relevance but is used because of the reportable limit of detection of the Lowry method.

The ELISA test is designed and performed to quantify native NRL proteins in an ammoniated state. NRL film extracts, prepared in accordance with the methods of the present invention, consistently yield low total protein and antigenic protein content using the ASTM methods, however reproducibility issues and divergent values were commonly observed due to protein modification. The Lowry does not have the required sensitivity and the ELISA is prone to variable protein hydrolysis occurring during treated latex formulation which causes anomalies in antigenic protein detection. It is worth noting that donning powder can create false positives and interfere with enzyme assays (ELISA) to some degree in research laboratories.

In an on-going effort to further describe treated NRL throughout its formulary process, we subjected several treated NRL unleached film extracts to direct spectrophotometric testing at 280 nm. At this wavelength, absorbed proteins can be read directly from the extract. This assessment of protein has the ability to measure all proteins including any morphed proteins no longer immuno-reactive (recognized by the ELISA antibodies). The utility of this method will rely on acceptable sensitivities and freedom from interferences. Preliminary 280 nm data are consistent in a downward trend in measured protein content demonstrating reasonable reproducibility.

TABLE 1

Spectrophtometric testing of 280 nm and antigenic protein in treated NRL films versus untreated *Hevea* NRL films.

| Sample ID | Treated NRL A (aged for 1 month) | Treated NRL B (aged for 1 month) | Control |
|---|---|---|---|
| ELISA ASTM D6499-03 (ug/ml) | 1.97 | 1.27 | 11.2 |
| ELISA ASTM D6499-03 (ug/g) | 9.8 | 6.3 | 56.3 |
| % Decrease vs. Control Avg of ug/ml & ug/g | 83% | 89% | n/a |
| O.D 280 nm (ug/g) | 0.25 | 0.18 | 2.01 |
| % Decrease vs. Control | 88% | 91% | n/a |

(Results Provided are an Average of Four Test Film Samples)

Example 3

Materials and Methods

One metric ton each of two treated NRL variants was prepared using a scale-up process ready for commercialization and distributed to selected industrial working partners. Both treated NRL variants used for production included the same amount of $Al(OH)_3$ with the difference being fresh vs. aged and when $Al(OH)_3$ was added to the latex. These samples are designated as "Treated NRL A" & "Treated NRL B" respectively. It is important to note that the treated NRL was prepared on a commercial scale and was scrutinized against a double centrifuged untreated *Hevea* NRL sample designated as "Control". The double centrifuge process is a popular approach taken by suppliers of latex rubber seeking to separate latex protein from latex rubber. This method is reported to reduce proteins levels by 50% compared to single centrifuged latex. The double centrifuge process yields a highly purified *Hevea* latex concentrate prepared by re-centrifuging the first centrifuged latex which has been suitably diluted. Films prepared from double centrifuged latex typically exhibit excellent clarity, low water absorption and high dielectric properties.

The colloidal properties were tested on the freshly prepared treated NRL and the control *Hevea* NRL then again after the lattices had matured for 21 days. The results of Treated NRL A, Treated NRL B and the control are listed in Table 2.

TABLE 2

Colloidal properties on fresh and aged Treated NRL and *Hevea* NRL.

| Test parameter | | TSC (%) | $NH_3$ content (%) | VFA no. | Free $Mg^{2+}$ (ppm) | Viscosity, cPs (sp 2/60) | MST (sec) | pH | Coagulum (mesh # 80/325) ppm |
|---|---|---|---|---|---|---|---|---|---|
| | Initial Field Latex | 37.57 | 0.36 | 0.021 | 145 | n/a | n/a | 10.47 | n/a |
| Treated NRL A & B (Pilot Scale) (fresh) | Treated NRL A | 61.52 | 0.73 | 0.017 | nil | 58 | 240 | 11.08 | 36/136 |
| | Treated NRL B | 61.48 | 0.71 | 0.018 | nil | 58 | 480 | 11.05 | 20/45 |
| | Control | 61.52 | 0.77 | 0.015 | nil | 87.5 | 300 | 11.01 | 8/31 |
| Treated NRL A & B (Pilot Scale) (after 21 days maturation) | Trated NRL A | 61.5 | 0.79 | 0.015 | nil | 56 | 2,160 | 11.32 | 18/89 |
| | Treated NRL B | 61.48 | 0.78 | 0.016 | nil | 66 | 2,627 | 11.4 | 12/91 |
| | Control | 61.52 | 0.75 | 0.015 | nil | 117.5 | 840 | 10.98 | 12/19 |

The colloidal property results from the treated NRL pilot trial were deemed acceptable by industry standards, and therefore the lattices were compounded by standard additives, which are commonly used to produce surgical gloves.

Example 4

Surgical Gloves Made from Treated NRL

Surgical gloves were coagulant dipped from all three compounds and were evaluated (Table 3) for physical property measurements according to ASTM standards.

TABLE 3

Physical properties of surgical gloves made from Treated NRL and *Hevea* NRL.

| Test Parameter | | Treated NRL A | Treated NRL B | Control |
|---|---|---|---|---|
| Unaged | Modulus @ 700% (Mpa) | 13.1 | 11.8 | 15.6 |
| | Tensile Strength (Mpa) | 22.9 | 26.9 | 29.1 |
| | Elongation @ Break (%) | 834 | 878 | 845 |
| Aged (100° C. @ 22 hrs) | Modulus @ 700% | 8.3 | 6.5 | 9.5 |
| | Tensile Strength (Mpa) | 27.4 | 25 | 24.2 |
| | Elongation @ Break (%) | 913 | 941 | 904 |

The physical properties of both Treated NRL A & B were within industry specifications. While not wishing to be bound by theory, again, it is believed that the surgical gloves made from Treated NRL demonstrate good stability upon aging due to the removal and deactivation by aluminum hydroxide of those molecular species that can be vulnerable to free radical breakdown. Protein results listed below in Table 4 appear to support this theory.

TABLE 4

Influence of compounding ingredients on Treated NRL and *Hevea* NRL.

ELISA and Lowry test results for surgical gloves made from Treated NRL versus *Hevea* NRL.

| Sample ID | ASTM D6499-03 ELISA (ug/ml) | ASTM D6499-03 ELISA (ug/g) | % Decrease vs. Control ELISA Avg. of ug/ml & ug/g | ASTM D5712-05 Lowry (ug/ml) | ASTM D5712-05 Lowry (ug/g) | % Decrease vs. Control Lowry Avg. of ug/ml & ug/g |
|---|---|---|---|---|---|---|
| Treated NRL A- Unleached | 1.1 | 5.7 | 91% | 18 | 78 | 89% |
| Treated NRL A- Wet Leached | 1.8 | 9.0 | 94% | 24 | 110 | 82% |
| Treated NRL A- Post Leached | 1.9 | 9.4 | 91% | 21 | 100 | 87% |
| Treated NRL B- Unleached | 1.7 | 8.7 | 87% | 15 | 78 | 90% |
| Treated NRL B- Wet Leached | 1.8 | 9.2 | 93% | 14 | 68 | 89% |
| Treated NRL B- Post Leached | 0.7 | 3.4 | 97% | <8.3 | <42 | >95% |
| Control- Unleached | 13.1 | 65.7 | n/a | 157 | 770 | n/a |
| Control- Wet Leached | 28.1 | 140.6 | n/a | 126 | 645 | n/a |
| Control- Post Leached | 20.6 | 103.2 | n/a | 154 | 795 | n/a |

Example 5

Condoms Made from Treated NRL

*Hevea* NRL condoms are produced in very large numbers on highly automated production lines. This industry relies almost exclusively on *Hevea* NRL since its ability to form smooth, continuous films on drying and exhibits high strength and elasticity when vulcanized and leached. A straight dipped production process is typically used for the production of condoms where a suitably shaped former is immersed in a latex mix and withdrawn, usually twice dipped, to produce a uniform layer of latex on the former. The latex deposit is dried and vulcanized before removal from the former.

A suitable mixture of compounding ingredients was used for all samples to ensure colloidal stability of the latex during processing. These properties are expressed in Table 5 below:

To prepare for dipping, the latex compounds were adjusted to 50% total solids. Using a clean straight wall condom former for two straight dips for each sample, the former was dipped into the respective latex compound and dried for 5 minutes @125° C. Next, the former was cooled at room temperature for 2 minutes then dipped again into the latex compound. This dip was followed by a drying time of 2 minutes @125° C. then the bead was rolled. After drying, the new created condom was cured for 25 minutes @125° C. The leaching was performed in hot water (93° C.) for 1 minute. After leaching, the condoms were dried for 3 minutes @125° C., then cooled at room temperature for a brief period. Next, the condoms were stripped from the former using dry starch powder. Finally the condoms were tested for physical performance (Table 6) and for ELISA and Lowry protein testing with results expressed below in Table 7.

TABLE 5

Influence of compounding ingredients on Treated NRL and *Hevea* NRL.

| Test parameter | Control Uncompounded | Control Compounded | Trated NRL A Uncompounded | Treated NRL A Compounded | Treated NRL B Uncompounded | Treated NRL B Compounded |
|---|---|---|---|---|---|---|
| pH | 10.82 | 11.24 | 11.43 | 11.05 | 11.22 | 10.77 |
| Viscosity (cp) | 69 | 94 | 70 | 18.5 | 68.5 | 20 |
| MST (secs) | 553 | 128 | 1,285 | 151 | 1,412 | 129 |
| TS (%) | 61.5 | 49.4 | 59.1 | 50.6 | 59.8 | 50.4 |
| ZOV@ 60 min. (cp) | 268 | NA | 56 | NA | 56 | NA |

TABLE 6

Physical properties of condoms made from Treated NRL and *Hevea* NRL.

| Test Parameter | | Treated NRL A | Treated NRL B | Control |
|---|---|---|---|---|
| Unaged | Modulus @ 500% (Mpa) | 1.4 | 1.4 | 1.5 |
| | Tensile Strength (Mpa) | 16.7 | 17.5 | 16.2 |
| | Elongation @ Break (%) | 887 | 864 | 846 |
| Aged (100° C. @ 22 hrs) | Modulus @ 500% | 1.6 | 1.7 | 1.8 |
| | Tensile Strength (Mpa) | 19.4 | 18.9 | 13.5 |
| | Elongation @ Break (%) | 839 | 864 | 758 |

Table 6 illustrates that condoms made from Treated NRL were 30% stronger than condoms made from *Hevea* NRL when aged and demonstrated much better resistance to aging compared to *Hevea* NRL condoms.

TABLE 7

ELISA and Lowry test results for condoms made from Treated NRL versus *Hevea* NRL.

| Sample ID | ASTM D6499-03 ELISA (ug/ml) | ASTM D6499-03 ELISA (ug/g) | ASTM D5712-05 Lowry (ug/ml) | ASTM D5712-05 Lowry (ug/g) |
|---|---|---|---|---|
| Treated NRL A | b.d (Below Detection) | <0.2 | b.d (Below Detection) | <47 |
| Treated NRL B | b.d. (Below Dection) | <0.2 | b.d (Below Detection) | <47 |
| Control | 1.2 | 6.1 | 12 | 60 |

*The ELISA results indicate >97% reduction in antigenic protein for the Treated NRL condom sample

Example 6

Adhesives Made from Treated NRL

NRL was the first polymer to be used to produce pressure sensitive adhesives (PSA). NRL has inherent advantages when used in pressure sensitive and contact adhesive formulations. NRL has a very low glass transition temperature (Tg) and also low surface energy which enables it to flow over surfaces very effectively, a key attribute of PSA. Furthermore, NRL's extremely high molecular weight gives it high internal strength preventing it from splitting during removal. The high molecular weight of NRL makes it the only material that can function as a "cold seal" contact adhesive at room temperature. This is made possible because the low Tg and surface energy allow rubber films to flow cold very well while the mixing of the polymer chains is retarded by molecular weight.

Some disadvantages of NRL are its ability to oxidize and become embrittled, loosing its tack and adhesion properties over time and its ability to "sensitize" skin as a result of allergic reactions. Oxidation is dealt with through use of anti-oxidants. Sensitization can be overcome with the use of a low protein starting NRL such as treated NRL, as it is understood that if high levels of protein are not present in the raw material they cannot appear in the manufactured product.

The objective of this phase of testing was to formulate cold seal (contact) and pressure sensitive adhesives using treated NRL and a *Hevea* NRL sample formulated for an adhesive compound and to conduct appropriate comparative testing for each sample. Test results are expressed in Table 8.

During the formulary process, one particular observation regarding treated NRL and the *Hevea* control NRL samples was the smoothness of the treated NRL sample, which is attributed to improved stability. This can eliminate the need for filtering during compounding and assist in the adhesive coating process downstream.

TABLE 8

Physical properties of cold seal and pressure sensitive adhesives made from treated and *Hevea* NRL.

| Test Parameter | Cold Seal Control | Cold Seal Treated NRL A | Cold Seal Treated NRL B | PSA Control | PSA Treated NRL A | PSA Treated NRL B |
|---|---|---|---|---|---|---|
| Brookfield Viscosity centipoise (cps) | 1,200 | 1,200 | 1,400 | 2,600 | 2,200 | 2,400 |
| Coat Weight (grams per in.²) | 24.8 | 36.4 | 35.0 | 38.0 | 35.8 | 25.9 |
| Thickness (mils) | 1.0 | 1.4 | 1.4 | 1.5 | 1.4 | 1.0 |
| pH | 10 | 10 | 10 | 9 | 9 | 9 |
| T-Peel ASTM D-1876 (Avg) units: (#/lineal in.) | 1.0 | 1.0 | 0.9 | n/a | n/a | n/a |
| (Standard Deviation) (σ) 1 min. Substrate: Face to Face* | 0.4 | 0.4 | 0.2 | n/a | n/a | n/a |
| Peel Adhesion ASTM D-3330 (Average) units: (#/lineal in.) | n/a | n/a | n/a | 3.3 | 5.2 | 4.0 |
| (Standard Deviation) (σ) 180° Peel 1 min. Substrate: Stainless Steel | n/a | n/a | n/a | 0.3 | 0.1 | 0.3 |

TABLE 8-continued

Physical properties of cold seal and pressure sensitive adhesives made from treated and *Hevea* NRL.

| Test Parameter | Cold Seal Control | Cold Seal Treated NRL A | Cold Seal Treated NRL B | PSA Control | PSA Treated NRL A | PSA Treated NRL B |
|---|---|---|---|---|---|---|
| Loop Tack ASTM D-6195 (Average) units: (#/in².) | 2.7 | n/a | 3.3 | 37.5 | n/a | 36.8 |
| (Standard Deviation) (σ) Substrate: Stainless Steel | 0.4 | n/a | 1.6 | 3.4 | n/a | 3.5 |
| Shear (minutes) ASTM D-3654 (Average) units: (minutes) | n/a | n/a | n/a | >10,080 | n/a | >10,080 |
| Storage Modulus @ −120° C. (Mpa) | 2,175 | n/a | 2,085 | 2,683 | n/a | 2,959 |
| Onset Tg° C. | −71.82 | n/a | −73.66 | −64.41 | n/a | −64.06 |
| Peak Tg° C. | −66.20 | n/a | −65.37 | −53.09 | n/a | −58.07 |

*Face to Face = Adhesive to Adhesive

It is concluded that low protein treated NRL can be substituted for versions of untreated *Hevea* NRL whether treated or not in the production of cold seal and pressure sensitive adhesives without compromising the physical performance of the resultant products. The use of the low protein NRL for adhesive applications is of particular importance because post leaching techniques commonly used for the removal of water soluble materials are not applicable for these product applications.

Example 7

Breather Bags, Tubing and Probe Covers Made from Treated NRL

Several additional medical products have been produced from treated NRL. The aim of this work was to coagulant dip breather bags and tubing and to straight dip probe covers using treated NRL under manufacturing conditions used to produce products made from *Hevea* NRL. The protein results are illustrated below in Table 9.

TABLE 9

ELISA and Lowry test results for projects made from Treated NRL.

| Sample ID | ASTM D6499-03 ELISA (ug/ml) | ASTM D6499-03 ELISA (ug/g) | ASTM D5712-05 Lowry (ug/ml) | ASTM D5712-05 Lowry (ug/g) |
|---|---|---|---|---|
| Breather bags made from treated NRL | b.d (Below Detection) | <0.2 | b.d (Below Detection) | <42 |
| Tubing made from Treated NRL | b.d (Below Detection) | <0.2 | b.d (Below Detection) | <42 |
| Probe covers made from Treated NRL | 0.1 | 0.4 | b.d (Below Detection) | <42 |

Throughout this application, various publications are referenced. The disclosures of these publications in their entireties are hereby incorporated by reference into this application.

Example 8

Foam Made from Treated NRL

Natural latex foam has been accepted by consumers and retailers as a premium bedding component. For example, due to the impact on soundness of sleep and the increased education of consumers, one-sided mattresses that do not require flipping are becoming an industry standard. The performance and silky, luxurious feel of latex have separated latex from other foam source materials in the marketplace.

Limited information exists regarding antigenic protein values in foam made with *Hevea* latex. Total latex proteins have been analyzed in *Hevea* latex foam that was prepared in a manner similar to that of the present invention for the production of NRL. Table 10, below, provides a comparison of protein data for foams made with the inventive NRL and with *Hevea* NRL.

TABLE 10

ELISA and Lowry Protein Test Results for
Foam made from Treated NRL and *Hevea* NRL

| Sample ID | ASTM D6499-03 ELISA (ug/g) | ASTM D5712-05 Lowry (ug/g) |
| --- | --- | --- |
| Foam made with Treated NRL | 4.7 | 50 |
| Foam made with *Hevea* NRL[24] | Test not performed | 2,185 |

In addition to having significantly fewer total proteins than foam produced with *Hevea* NRL, the inventive NRL foam was less odorous. This beneficial feature can be attributed to a lower level of biodegradable proteins in the inventive NRL. Other beneficial properties of the foam produced from the inventive NRL included noticeably higher opacity and whiteness.

Example 9

Preparation of Treated NRL Films

In another example, a series of films were prepared from field latex. The preparation of each film sample included the addition of 0.5 phr of Al(OH)$_3$. Since Al(OH)$_3$ is insoluble, it was added to a quantity of field latex (27% TSC) in the form of a slurry. The Al(OH)$_3$ slurry was a combination of 1 phr of 10% ammonium hydroxide (NH$_4$OH) and 0.5 phr Al(OH)$_3$. In addition, 0.1 phr of ammonium laurate was added to the field latex composition.

The prepared mixture was added to the field latex and agitated for 24 hours under typical industry mixing conditions (for example, 30 rpm for 24 hours). A calculated amount of diammonium hydrogen phosphate (DAP), based on the amount of free magnesium present, was added to treat free Mg$^{2+}$, followed by a period of 16 hours for desludging. The field latex composition was then centrifuged to obtain desirable TSC of from about 63% to about 64%. The composition was then diluted to about 30% TSC with ammoniated water, followed by a centrifuge step to reach a TSC of from about 60% to about 62%. Films for antigenic protein testing were then prepared according to ASTM D6499-07. Protein levels of the treated and untreated control samples are detailed in Table 11, below.

TABLE 11

Protein levels of Treated and Untreated Control Samples

| | Initially after processing (ug/g) | 21 day maturation period (ug/g) |
| --- | --- | --- |
| Treated samples | | |
| 11-1 | 1.3 | 3.3 |
| 11-2 | 2.7 | 4 |
| 11-3 | 2.6 | 8.7 |
| 11-4 | 2.3 | 3.9 |
| Untreated Control samples | | |
| 11-5 | 3.5 | 1 |
| 11-6 | 3.4 | 91 |
| 11-7 | 3.2 | 22 |
| 11-8 | 2.7 | 5.7 |

Example 10

Preparation of Treated NRL Films

In a tenth example, a foam compound was prepared having reduced amounts of antigenic protein, relative to a non-treated foam compound. The ingredients of the natural latex composition are listed in Table 12.

TABLE 12

| Foam Compound Ingredients | |
| --- | --- |
| Ingredient | Parts by weight |
| Part A (Vytex ® NRL) | 100.00 |
| Part B (Independent foam manufacturer foaming process | 4.20 |
| 50% ZnO | 2.70 |
| 50% SSF (Sodium Silicofluoride) | 4.00 |

The foam mixing process comprises first stirring Part A to homogeneity. Next, the desired amount of Part A is weighed out into a mixing port. Part A is then added to Part B; Part B is shaken or stirred prior to the addition of Part A. The resulting mixture is kept under slow stirring for about 2 hours at ambient temperature. The mixture is then transferred into the foam mixer. The whipping speed is increased to moderate, and this speed is maintained for about 4 minutes. The whipping speed is increased above moderate, and then 50% ZnO is slowly added into the foam. ZnO, in various aspects, can be added to destabilize the liquid NRL and assist in the foaming process. After the addition, whipping is continued until a very fine foam is obtained. 50% SSF is then added, followed by whipping for another 40-80 seconds. The foam is then immediately transferred into the mould. The foam is then gelled for about 5 to 10 minutes. Once the foam is gelled, the mould is transferred into a steam chamber, and steamed at 110 to about 120° C. for at least about 15 minutes. The foam is then removed from the mould washed with water. The foam is then cured at about 50° C. for about 10 to 12 hours.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of treating a liquid natural rubber latex comprising:
    contacting an un-vulcanized untreated liquid natural rubber latex with at least about 0.01 phr aluminum hydroxide and a surfactant to complex at least a portion of proteins, lipids and lutoids contained within the untreated liquid natural rubber latex with the aluminum hydroxide;
    removing the proteins, lipids and lutoids complexed with aluminum hydroxide; and
    forming a treated liquid natural rubber latex composition having less than 10 µg of antigenic protein per gram of composition and having improved optical properties as compared to the untreated liquid natural rubber latex due to the removing of the proteins, lipids and lutoids complexed with aluminum hydroxide.

2. The method of claim 1, further comprising producing an article from the treated liquid natural rubber latex composition after removing the aluminum hydroxide.

3. The method of claim 2, wherein the article is one or more of an adhesive, a condom, glove, breather bag, probe cover, catheter, thread, balloon, or foam.

* * * * *